US010748149B2

(12) United States Patent
Hammad et al.

(10) Patent No.: US 10,748,149 B2
(45) Date of Patent: *Aug. 18, 2020

(54) ALERT ARCHITECTURE

(71) Applicant: Visa International Service Association, San Francisco, CA (US)

(72) Inventors: Ayman Hammad, Pleasanton, CA (US); Mark Carlson, Half Moon Bay, CA (US)

(73) Assignee: Visa International Service Association, San Francisco, CA (US)

( * ) Notice: Subject to any disclaimer, the term of this patent is extended or adjusted under 35 U.S.C. 154(b) by 773 days.

This patent is subject to a terminal disclaimer.

(21) Appl. No.: 15/369,683

(22) Filed: Dec. 5, 2016

(65) Prior Publication Data

US 2017/0083912 A1 Mar. 23, 2017

Related U.S. Application Data

(63) Continuation of application No. 12/720,627, filed on Mar. 9, 2010, now Pat. No. 9,542,675.

(Continued)

(51) Int. Cl.
*G06Q 20/40* (2012.01)
*G08B 5/22* (2006.01)
(Continued)

(52) U.S. Cl.
CPC ......... *G06Q 20/401* (2013.01); *G06Q 20/202* (2013.01); *G06Q 20/325* (2013.01);
(Continued)

(58) Field of Classification Search
CPC ............................ G06Q 40/02; G06Q 20/401
See application file for complete search history.

(56) References Cited

U.S. PATENT DOCUMENTS 5,448,471 A  9/1995 Deaton et al.
5,483,444 A  1/1996 Heintzeman et al.
(Continued)

FOREIGN PATENT DOCUMENTS

AU  2005279689  3/2006
AU  2010245053  11/2011
(Continued)

OTHER PUBLICATIONS

Wolf, Jim, "New Web Service Warns of Identity Theft," <www.greenspun.com/bboard/q-and-a-fetch-msg.tcl?msg_id=003yBJ>, Oct. 23, 2000, printed May 4, 2011. (Year: 2000).*

(Continued)

*Primary Examiner* — Eric T Wong
(74) *Attorney, Agent, or Firm* — Kilpatrick Townsend & Stockton LLP

(57) ABSTRACT

Systems, architecture of the systems, and methods for generating alert message are disclosed. A user enrolls in an alert messaging service. Information that the user provides during an enrollment process are sent into a database. the user performs a transaction using a portable consumer device. Transaction data are sent to a computer apparatus. The computer apparatus accesses the database containing alert customization data. An alert message is generated based on the transaction data and the alert customization data. The alert message is sent to a user device. The systems, resources and processes responsible for performing the transaction and providing the alert messages are separated so that the transaction processing and alert generation are performed in parallel by systems in communication with each other. Utilizing such method prevents the transaction processing system from being overloaded with additional processes, while maintains a desired level of efficiency, security and reliability of the payment processing system.

20 Claims, 6 Drawing Sheets

Related U.S. Application Data

(60) Provisional application No. 61/173,371, filed on Apr. 28, 2009.

(51) Int. Cl.

| | | |
|---|---|---|
| *G06Q 30/00* | (2012.01) | |
| *G06Q 30/02* | (2012.01) | |
| *G06Q 50/26* | (2012.01) | |
| *H04L 12/18* | (2006.01) | |
| *H04L 29/08* | (2006.01) | |
| *G06Q 40/00* | (2012.01) | |
| *G06Q 20/20* | (2012.01) | |
| *G06Q 20/32* | (2012.01) | |
| *G08B 25/00* | (2006.01) | |

(52) U.S. Cl.
CPC ......... *G06Q 20/40* (2013.01); *G06Q 30/0185* (2013.01); *G06Q 30/0224* (2013.01); *G06Q 30/0236* (2013.01); *G06Q 40/12* (2013.12); *G06Q 50/265* (2013.01); *G08B 5/229* (2013.01); *G08B 25/004* (2013.01); *H04L 12/1895* (2013.01); *H04L 67/04* (2013.01); *H04L 67/26* (2013.01); *H04L 67/306* (2013.01)

(56) References Cited

U.S. PATENT DOCUMENTS

| | | |
|---|---|---|
| 5,513,250 A | 4/1996 | McAllister |
| 5,530,438 A | 6/1996 | Bickham et al. |
| 5,592,560 A | 1/1997 | Deaton et al. |
| 5,604,921 A | 2/1997 | Alanara |
| 5,615,110 A | 3/1997 | Wong |
| 5,642,485 A | 6/1997 | Deaton et al. |
| 5,708,422 A | 1/1998 | Blonder et al. |
| 5,774,882 A | 6/1998 | Keen et al. |
| 5,852,775 A | 12/1998 | Hidary |
| 5,878,337 A | 3/1999 | Joao et al. |
| 5,903,830 A | 5/1999 | Joao et al. |
| 6,012,144 A | 1/2000 | Pickett |
| 6,049,778 A | 4/2000 | Walker et al. |
| 6,055,570 A | 4/2000 | Nielsen |
| 6,064,990 A | 5/2000 | Goldsmith |
| 6,067,529 A | 5/2000 | Ray et al. |
| 6,185,200 B1 | 2/2001 | Prasad |
| 6,185,290 B1 | 2/2001 | Shaffer et al. |
| 6,185,541 B1 | 2/2001 | Scroggie et al. |
| 6,292,786 B1 | 9/2001 | Deaton et al. |
| 6,311,169 B2 | 10/2001 | Duhon |
| 6,324,525 B1* | 11/2001 | Kramer ............... G06Q 20/00 705/40 |
| 6,330,550 B1 | 12/2001 | Brisebois et al. |
| 6,353,398 B1 | 3/2002 | Amin et al. |
| 6,381,324 B1 | 4/2002 | Shaffer et al. |
| 6,418,436 B1 | 7/2002 | Degen et al. |
| 6,424,951 B1 | 7/2002 | Shurling et al. |
| 6,442,532 B1 | 8/2002 | Kawan |
| 6,484,148 B1 | 11/2002 | Boyd |
| 6,505,046 B1 | 1/2003 | Baker |
| 6,529,725 B1 | 3/2003 | Joao et al. |
| 6,535,855 B1 | 3/2003 | Cahill et al. |
| 6,553,100 B1 | 4/2003 | Chen et al. |
| 6,608,556 B2 | 8/2003 | De Moerloose et al. |
| 6,612,488 B2 | 9/2003 | Suzuki |
| 6,636,587 B1 | 10/2003 | Nagai et al. |
| 6,647,269 B2 | 11/2003 | Hendrey et al. |
| 6,684,195 B1 | 1/2004 | Deaton et al. |
| 6,741,188 B1 | 5/2004 | Miller et al. |
| 6,775,539 B2 | 8/2004 | Deshpande |
| 6,842,774 B1 | 1/2005 | Piccioni |
| 6,859,451 B1 | 2/2005 | Pasternack et al. |
| 6,873,972 B1 | 3/2005 | Marcial et al. |
| 6,879,838 B2 | 4/2005 | Rankin et al. |
| 6,891,911 B2 | 5/2005 | Rostoker et al. |
| 6,912,398 B1 | 6/2005 | Domnitz |
| 6,913,194 B2 | 7/2005 | Suzuki |
| 6,970,850 B1 | 11/2005 | Freeny, Jr. |
| 6,993,326 B2 | 1/2006 | Link, II et al. |
| 7,003,497 B2 | 2/2006 | Maes |
| 7,024,211 B1 | 4/2006 | Martin |
| 7,024,396 B2 | 4/2006 | Woodward |
| 7,027,801 B1 | 4/2006 | Hall et al. |
| 7,028,052 B2 | 4/2006 | Chapman et al. |
| 7,092,724 B2 | 8/2006 | Fellenstein et al. |
| 7,096,003 B2 | 8/2006 | Joao et al. |
| 7,100,049 B2 | 8/2006 | Gasparini et al. |
| 7,167,830 B2 | 1/2007 | Sravanapudi et al. |
| 7,203,300 B2 | 4/2007 | Shaffer et al. |
| 7,310,534 B2 | 12/2007 | Northcutt |
| 7,337,119 B1 | 2/2008 | Geschwender et al. |
| 7,343,149 B2 | 3/2008 | Benco et al. |
| 7,355,990 B2 | 4/2008 | Smith et al. |
| 7,356,506 B2 | 4/2008 | Smith et al. |
| 7,357,310 B2 | 4/2008 | Calabrese et al. |
| 7,389,275 B2 | 6/2008 | Kemper et al. |
| 7,418,086 B2 | 8/2008 | Sravanapudi et al. |
| 2001/0011245 A1 | 8/2001 | Duhon |
| 2001/0029485 A1 | 10/2001 | Brody et al. |
| 2002/0077964 A1 | 6/2002 | Brody et al. |
| 2002/0087460 A1 | 7/2002 | Hornung |
| 2002/0095380 A1 | 7/2002 | Singhal |
| 2002/0116322 A1 | 8/2002 | Schnall |
| 2002/0133462 A1 | 9/2002 | Shteyn |
| 2002/0198783 A1 | 12/2002 | Bates et al. |
| 2003/0061163 A1 | 3/2003 | Durfield |
| 2003/0105707 A1 | 6/2003 | Audebert et al. |
| 2003/0144952 A1 | 7/2003 | Brown et al. |
| 2003/0182191 A1 | 9/2003 | Oliver et al. |
| 2004/0039683 A1 | 2/2004 | Mcgeorge |
| 2004/0064401 A1 | 4/2004 | Palaghita et al. |
| 2004/0078340 A1 | 4/2004 | Evans |
| 2004/0103049 A1 | 5/2004 | Kerr |
| 2004/0199470 A1 | 10/2004 | Ferry, Jr. et al. |
| 2005/0136949 A1 | 6/2005 | Barnes, Jr. |
| 2005/0154665 A1 | 7/2005 | Kerr |
| 2005/0170814 A1 | 8/2005 | Joao et al. |
| 2005/0199775 A1 | 9/2005 | Kaminski et al. |
| 2006/0059110 A1 | 3/2006 | Madhok et al. |
| 2006/0089905 A1 | 4/2006 | Song et al. |
| 2006/0200396 A1 | 9/2006 | Satterfield et al. |
| 2006/0202025 A1 | 9/2006 | Calabrese et al. |
| 2006/0277142 A1 | 12/2006 | McGeorge |
| 2006/0281439 A1 | 12/2006 | Benco et al. |
| 2007/0006286 A1 | 1/2007 | Singhal |
| 2007/0093234 A1 | 4/2007 | Willis et al. |
| 2007/0100773 A1 | 5/2007 | Wallach |
| 2008/0004950 A1 | 1/2008 | Huang et al. |
| 2008/0010203 A1 | 1/2008 | Grant |
| 2008/0147484 A1 | 6/2008 | Davis |
| 2008/0156869 A1 | 7/2008 | Carr et al. |
| 2008/0163257 A1 | 7/2008 | Carlson et al. |
| 2008/0167990 A1* | 7/2008 | Grant ............... G06Q 20/102 705/44 |
| 2008/0182590 A1 | 7/2008 | Ruckart et al. |
| 2008/0183480 A1 | 7/2008 | Carlson et al. |
| 2008/0200144 A1* | 8/2008 | Ginsberg ............... H04M 11/04 455/407 |
| 2008/0288385 A1 | 11/2008 | Geschwender et al. |
| 2009/0048953 A1 | 2/2009 | Hazel et al. |
| 2009/0106846 A1 | 4/2009 | Dupray et al. |
| 2009/0144308 A1 | 6/2009 | Huie et al. |
| 2010/0274572 A1 | 10/2010 | Hammad et al. |

FOREIGN PATENT DOCUMENTS

| | | |
|---|---|---|
| AU | 2010245053 | 7/2014 |
| GB | 2372867 | 9/2002 |
| MX | 2011011400 | 2/2012 |
| WO | 0046769 | 8/2000 |
| WO | 0193213 | 12/2001 |

(56) References Cited

FOREIGN PATENT DOCUMENTS

| WO | 2006024080 | 3/2006 |
|---|---|---|
| WO | 2009026318 | 2/2009 |
| WO | 2010129282 | 2/2011 |

OTHER PUBLICATIONS

U.S. Appl. No. 12/720,627, "Final Office Action", dated Jul. 26, 2012, 11 pages.
U.S. Appl. No. 12/720,627, "Final Office Action", dated May 12, 2016, 17 pages.
U.S. Appl. No. 12/720,627, "Final Office Action", dated Feb. 4, 2015, 9 pages.
U.S. Appl. No. 12/720,627, "Non-Final Office Action", dated Dec. 15, 2011, 13 pages.
U.S. Appl. No. 12/720,627, "Non-Final Office Action", dated Oct. 8, 2015, 15 pages.
U.S. Appl. No. 12/720,627, "Non-Final Office Action", dated Sep. 2, 2014, 7 pages.
AU2010245053, "First Examiner Report", dated Mar. 1, 2013, 3 pages.
AU2010245053, "Notice of Acceptance", dated Jun. 20, 2014, 2 pages.
CA2,760,422, "Office Action", dated Nov. 6, 2013, 3 pages.
MX/A/2011/011400, "Office Action", dated Jul. 28, 2014, 3 pages.
MX/A/2011/011400, "Office Action", dated May 27, 2013, 3 pages.
MX/A/2011/011400, "Office Action", dated Nov. 1, 2013, 3 pages.
PCT/US2010/032583, "International Preliminary Report on Patentability", dated Nov. 10, 2011, 6 pages.
PCT/US2010/032583, "International Search Report and Written Opinion", dated Nov. 30, 2010, 7 pages.
Wolf, "New Web Service Warns of Identity Theft", Available online at: www.greenspun.com/bboard/q-anda-fetch-msg.tclmsg id=003yBJ, Oct. 23, 2000, 2 pages.

* cited by examiner

ALERT ARCHITECTURE

CROSS-REFERENCES TO RELATED APPLICATIONS

The present application is a continuation of U.S. application Ser. No. 12/720,627, filed Mar. 9, 2010 of which claims benefit under 35 U.S.C. § 119(e) of U.S. Provisional Patent Application No. 61/173,371, entitled "Alerts Based System and Method," filed Apr. 28, 2009, the entire disclosure of which is incorporated herein by reference for all purposes.

BACKGROUND

A Payment Processing Network (PPN) that performs transaction processing, may be used for a variety of information-based services one of which is alert messages that enhance the user payment experience. Alert messages can be derived from the inherent information in each transaction and other customization settings. Alert messages provide a means of notifying a user about recent transactions and/or account activities in a tailored format. Such alerts may be in the form of messages tailored based on various metrics. These metrics may specify the type of the information user wants to see such as recent transactions, account balance, transaction amounts over specified pre-ser limits, and/or format of the alerts which may specify the language, amount of detail and the type of user devices used to receive the messages, among others.

Providing services such as the alert messages, requires an appropriate amount of resources and processing power. Using the existing resources of a Payment Processing Network to allow for additional processes, results in some concerns and may not be a feasible approach. Various parts of a Payment Processing Network are designed to withstand catastrophic conditions, and to be secure, efficient and reliable. The addition of other processes, that are not integral part of the payment processing, may impair one or more of such characteristics. For example, modifying the existing resources to allow for processing the alert messages may overload the system and may negatively affect the efficiency. Also, various aspects of the alert generation may be related to exchange of data between third party resources which may negatively affect security.

Embodiments of the invention address these and other problems, individually and collectively.

BRIEF SUMMARY

Embodiments of the invention disclosed herein include systems, technical architecture of the systems, and methods for generating alert messages. The alert message system can be implemented using one or more computer apparatus and databases. In embodiments of the invention, processes and resources of a payment processing system are separated from the processes and resources used to generate and deliver the alert messages.

One embodiment of the invention is directed to a system and method for performing an electronic payment transaction with a portable consumer device and receiving an alert message generated by one or more computer apparatus and databases which are operationally separated from the resources of the payment processing network. A user uses his portable consumer device to perform an electronic payment transaction, and transaction data associated with a payment transaction are received at a first computer apparatus in the payment processing network. A database in the payment processing network is accessed to determine if the transaction is associated with an account enrolled in the alert service. If the account is enrolled in the alert service, the transaction data are sent to a second computer apparatus separated from the resources of the payment processing network. The second computer apparatus accesses a database comprising alert customization data. The second computer apparatus then generates an alert message using the transaction data and the alert customization data. The generated alert message is then sent to a user device.

Another embodiment of the invention is directed to a method for sending the transaction data from the payment processing network to an IP (Internet Protocol) Gateway for alert message generation, and delivery based on an enrollment record of the account associated with the transaction that is stored in a database accessible by the payment processing network.

These and other embodiments of the invention are described in further detail below.

DETAILED DESCRIPTION

Figure 1:
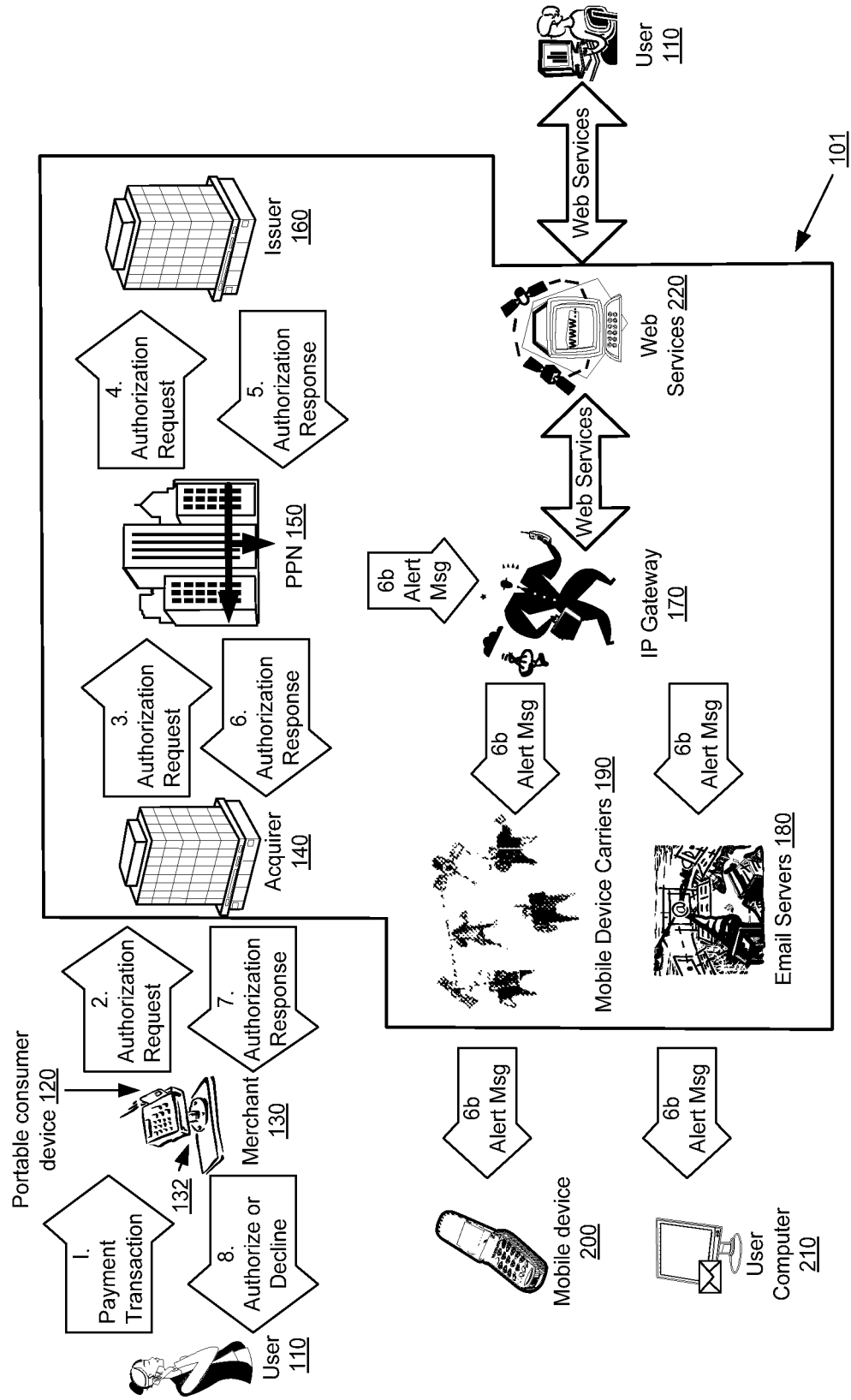
FIG. 1 shows an alert messaging system, according to an embodiment of the invention.

Embodiments of the invention are directed to systems, architectures of the systems, and methods for providing alert messages to users when performing electronic payment transactions, without burdening the resources of a Payment Processing Network (PPN).

In certain embodiments, alert messages can be based on information being processed through the payment processing network which may include a processing system such as an IP system (Integrated Payments system). The integrated payments system can be a financial processing switch, can accept inputs (transaction requests) from acquirers and can forward the authorization request message to the institution that issued the card/account (i.e., the issuer). The issuer can then respond with an approval or can decline the transaction, and the response message can be switched back to the originating acquirer (and to the originating merchant). The integrated payments system can be built to withstand catastrophic conditions using redundancy of platforms and physical locations.

To increase security and reliability, other services such as alerts can be performed by separate systems in communication with the payment processing network and the integrated payments system. In certain embodiments, a second system outside of integrated payments can be created to manage the alerts. This can be a second database(s), servers, and connectivity systems used specifically for entities and services outside of traditional transaction processing. This second system may be referred to as the IP (Internet Protocol) Gateway, and may include its own server(s), database(s), and interfaces to many different endpoints for the purposes of sending alert messages. In some embodiments, a payment processing network can comprise both the integrated payments system and the IP Gateway. Thus, the system(s) and processes (collectively referred to as "alert engine" or "rule engine") used for providing alert messages may comprise the IP Gateway alone or in combination with all or portions of the integrated payments system or other suitable systems. Segmenting the databases and systems can provide a number of benefits which will be described in detail.

In certain implementations, moving alert processing to the IP Gateway (and thus outside of the payment processing network and integrated payments system) can reduce the workload on the payment processing network and the integrated payments system and allows them to focus on other specified tasks (such as processing transaction requests). The IP Gateway can process the alert related tasks of trigger processing, message creation, connectivity to alert end points like email, SMS Text operators, voice response systems, and other web interfaces. The IP Gateway may be configured to send messages using one or more message interfaces that can connect to various delivery channels. This can allow for limited or no impact to payment processing network and integrated payments system transaction processing, resulting in fast transactions. Furthermore, it may be possible to shut down the peripheral service (IP Gateway) without impacting the core systems (integrated payments system and other transaction processing), to prevent any impact on transaction processing. In certain implementations, outside entities may connect to the IP Gateway, to access the database(s) therein or other services. This can enhance services such as web service connection to the IP Gateway database(s).

The IP Gateway can include both processors and server computers referred to as notification server computer(s) (for determining how to handle alerts and transactions, using specific parameters), and one or more databases for storing issuer information, cardholder enrollment data, and transaction data (i.e., records of transactions and alerts). The IP Gateway can also include computer readable media and processors for executing reporting and billing logic (such as reporting on billings, status, fraud, consumer data, etc.). The IP Gateway can have a messaging interface for delivery channel logic. This messaging interface allows the IP Gateway to send and receive messages using any suitable communication channel, such as Text (SMS) messages, email, web delivery, etc. The IP Gateway further provides web services, for access to the system using one or more web enabled browsers. The web services can allow for enrollment of users in the alerts and other services. Enrollment may be performed by filling in fields on a website (one or more users at a time) hosted by an enrollment server computer, or may be done in batch, by file delivery from an issuer or other party. The web services can further provide customer service functions for the user and the issuer.

In certain embodiments, alerts can be generated after a payment transaction has been authorized. Thus, a message can be processed through the integrated payments system (and in certain implementations the IP Gateway), but can be generated as the payment transaction is returned from the issuer in an authorization response message. This processing allows the alert to be withheld if the payment transaction is declined, minimizing any possible confusion by the consumer (i.e., no alerts may be sent for payment transactions that are not completed). The alert engine may add another trigger that generates a special message based on the declined payment transaction. This "declined transaction" trigger can provide another tool to discover fraud. Thus, a user may receive a message regarding a declined transaction in which the user did not originate.

In certain embodiments, alerts can be sent at the earliest point in a switched transaction where all information is present from all entities (consumer, merchant, acquirer, issuer, etc.). These alerts can be "real time" or "near real time," and can contain all relevant results and information regarding the payment transaction. The payment authentication message may be passed to the IP Gateway for alternate communications such as SMS messages or email. This can improve the payment experience for certain payment methods such as mobile based money transfer. In other embodiments, the payment transaction may be passed to other alternative systems and/or may be passed at other steps in the transaction flow.

The database(s), such as the enrollment database, within the payment processing network and the integrated payments system can be synchronized with the database(s) within the IP Gateway. Furthermore, the IP Gateway can send messages regarding the payment transaction through various delivery channels, such as by SMS message, email, or other delivery methods such as instant message or other web based services. The IP Gateway may also be accessible to online banking services such enrollment with an issuer, account management, and customer service functions, through web services. The web services may be on websites controlled by the payment processing system or the issuer, or may be controlled by a combination of the payment processing system and the issuer. In certain implementations the website may be hosted by one entity but can redirect the user to a site hosted by another entity.

In certain embodiments, the enrollment database(s) within the payment processing system or other systems (e.g., the issuer) may be efficiently connected. Such connection can synchronize mobile payment and message based user information, with core enrollment user information found in the integrated payments system. This can improve quality of service, fraud reduction, and improve reputation tracking. In certain implementations, the optimization described above can be used with any payment processor that addresses mobile cardholder enrollments.

The enrollment database in the integrated payments system can share information with the cardholder enrollment database in the IP Gateway. In certain implementations, this can allow for a "thin" database within the integrated payments system that includes all users enrolled in alert services. Thus, as a payment transaction is processed by the payment processing network (using the integrated payments system), the thin database can allow for fast determination of whether an alert should be generated. If it is determined that an alert should be generated, the transaction can be forwarded to the IP Gateway. If no alert should be generated, the integrated payments system can bypass the IP Gateway and can forward the transaction to the appropriate party, such as the acquirer. This prevents the IP Gateway from having to process unnecessary transactions (such as transactions without alerts) while maintaining secure and fast process flow. The dual database approach provides for fast processing as it can filter out the transactions that require alert processing from the transactions that do not. The system can optimize enrollment database information from the integrated payments system to the IP Gateway. The card enrollment functions can be performed via web services for customer services in communication with the IP Gateway. The IP Gateway can also send data via various user channels and issuer online banking services.

Other specific examples of embodiments of the invention are described in further detail below.

I. System

FIG. 1 is a diagram illustrating an alert messaging system 100, in accordance with an embodiment of the invention. The alert messaging system 100 includes a user 110, a portable consumer device 120, a merchant 130, an access device 132, an acquirer 140, a Payment Processing Network (PPN) 150, an issuer 160, an IP Gateway 170, mobile device carriers 190, e-mail servers 180, a mobile device 200, a user computer 210, and web services 220. Although one user 110, one mobile device 200, one user computer 210, one merchant 130, one acquirer 140, and one issuer 160 are shown, there may be any suitable number of any of these entities in intelligent alert messaging system 100.

User 110 is in operative communication with the portable consumer device 120. Merchant 130 has an access device 132 for interacting with the consumer portable device 120 and acquirer 140 associated with merchant 130. Acquirer 140 is in communication with issuer 160 through payment processing network 150.

The alert messaging system 100 also includes a mobile device 200 in operative communication with user 110 for displaying alert messages to the user 110.

The alert message system 100 also includes an IP Gateway 170 that is in communication with payment processing network 150. IP Gateway 170 receives the transaction data from the payment processing network 150 and generates the alert messages. IP Gateway 170 is also in communication with the mobile device carriers 190, e-mail servers 180, and web services 220. The mobile device carriers 190 are in operative communication with the mobile device 200, and the mail servers 180 are in operative communication with the user computer 210. The alert messages that are generated from IP Gateway 170 are sent to the mobile device carriers 190 and/or mail servers 180 to be sent to the mobile device 200, and/or to be accessed by the user computer 210. The web services 220 is also in operative communication with the user 110 for enrolling the user 110 in the alert messaging service provided by the alert messaging system 100.

Each of the components shown in FIG. 1 is described in further detail below.

Figure 2:
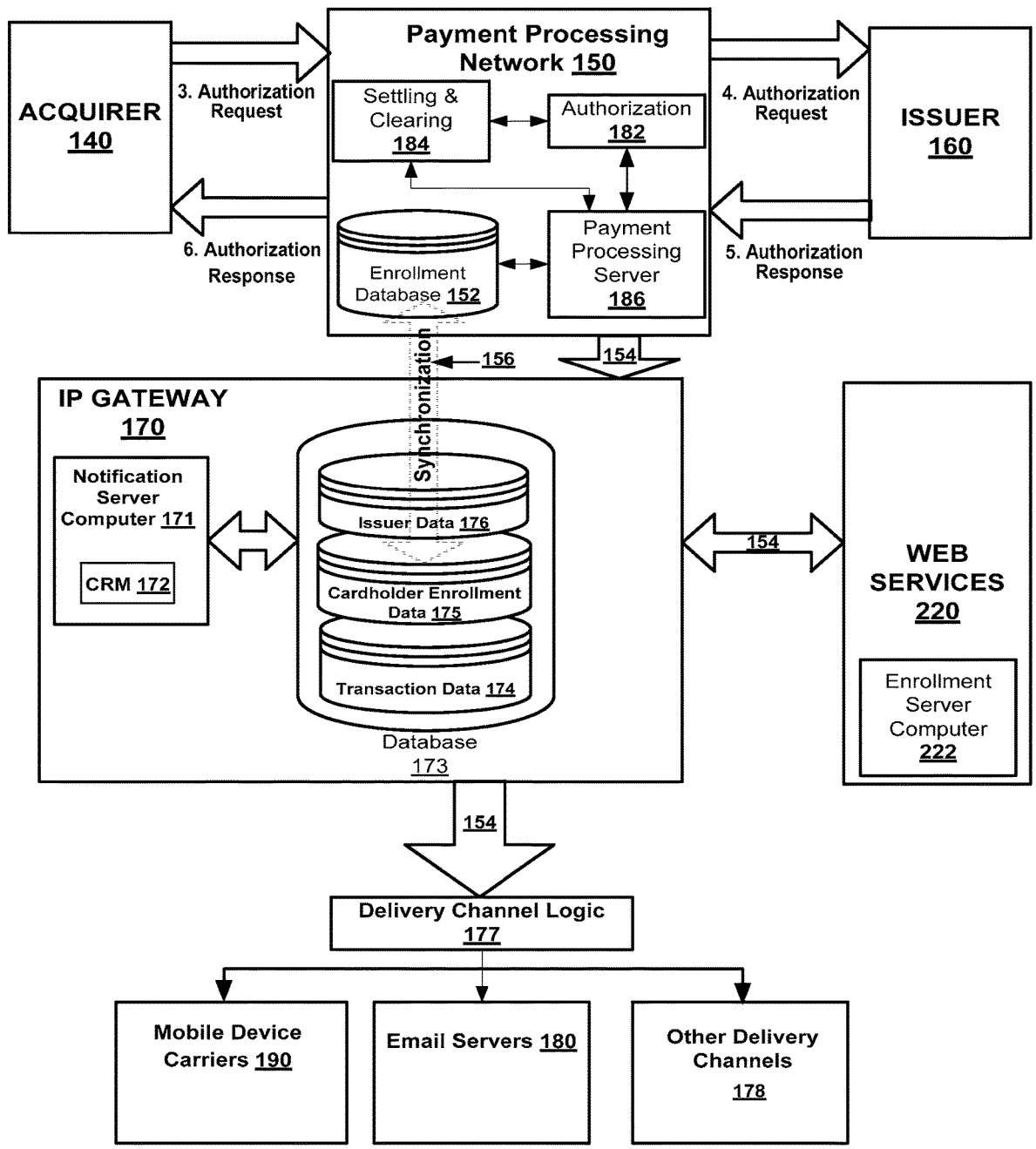
FIG. 2 shows the architecture of a subset of the alert messaging system, according to an embodiment of the invention.

FIG. 2 is a diagram illustrating the architecture of a subsystem 101 of the alert system 100. FIG. 2 illustrates more details about the IP Gateway 170. The IP Gateway 170 includes a notification server computer 171 having a computer-readable medium (CRM) 172, and a processor (not shown) that is coupled to the CRM 172. Although one CRM 172 is shown in FIG. 2, the notification server computer 171 may house more than one CRM as needed. The notification server computer 171 is in communication with database 173. In some embodiments, database 173 may be included in the notification server computer 171. Database 173 contains alert customization data that are used to generate the alert messages. The alert customization data includes transaction data 174, cardholder enrollment data 175 (which includes account identifiers associated with portable consumer devices of users enrolled in the alert messaging service), and issuer data 176. Cardholder enrollment data 175 are synchronized with the enrollment database 152 via the synchronization link 156. The enrollment database 152 contains data related to users who are enrolled in the alert messaging service. As shown in FIG. 2, IP Gateway 170 is in communication with payment processing network 150, and web services 220 via the network connection 154 which may be in any suitable form. The network connection 154 may include, for example, at least a portion of the Internet. Delivery channel logic 177 is in communication with IP Gateway 170, mobile service carriers 190, e-mail servers 180, and other delivery channels 178.

User 110 refers to an individual or organization such as a business that is capable of purchasing goods or services or making any suitable payment transaction with merchant 130.

Portable consumer device 120 refers to any suitable device that allows the payment transaction to be conducted with merchant 130. Portable consumer device 120 may be in any suitable form. For example, suitable portable consumer devices 120 can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of portable consumer devices 120 include cellular phones, personal digital assistants (PDAs), pagers, payment cards, security cards, access cards, smart media, transponders, and the like. In some cases, portable consumer device 120 may be associated with an account of user 110 such as a bank account.

Merchant 130 refers to any suitable entity or entities that make a payment transaction with user 110. Merchant 130 may use any suitable method to make the payment transaction. For example, merchant 130 may use an e-commerce business to allow the payment transaction to be conducted by merchant 130 and user 110 through the Internet. Other examples of merchant 130 include a department store, a gas station, a drug store, a grocery store, or other suitable business.

Access device 132 may be any suitable device for communicating with merchant 130 and for interacting with portable consumer device 120. Access device 132 can be in any suitable location such as at the same location as merchant 130. Access device 132 may be in any suitable form. Some examples of access devices 132 include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. Access device 132 may use any suitable contact or contactless mode of operation to send or receive data from portable consumer devices 120.

If access device 132 is a POS terminal, any suitable POS terminal may be used and may include a reader, a processor, and a computer-readable medium. Reader may include any suitable contact or contactless mode of operation. For example, exemplary card readers can include radio frequency (RF) antennas, optical scanners, bar code readers, magnetic stripe readers, etc. to interact with portable consumer device 120.

Acquirer 140 refers to any suitable entity that has an account with merchant 130. In some embodiments, issuer 160 may also be acquirer 140.

Payment processing network (PPN) 150 refers to a network of suitable entities that have information related to an account associated with portable consumer device 120. This information includes data associated with the account on portable consumer device 120 such as profile information, data, and other suitable information.

Payment processing network 150 may have or operate a server computer and may include a database. The database may include any hardware, software, firmware, or combination of the preceding for storing and facilitating retrieval of information. Also, the database may use any of a variety of data structures, arrangements, and compilations to store and facilitate retrieval of information. The server computer may be coupled to the database and may include any hardware, software, other logic, or combination of the preceding for servicing the requests from one or more client computers. Server computer may comprises one or more computational apparatuses and may use any of a variety of computing structures, arrangements, and compilations for servicing the requests from one or more client computers. For illustration purposes, examples of some of the elements of the payment processing network 150 such as authorization module 182, settling and clearing module 184 and payment processing server computer 186 are shown in FIG. 2. Each of settling and clearing module 184, authorization module 182, and the payment processing server 186 contain an appropriate number of computer readable mediums and processors (not shown) that perform the functions described herein with respect to these elements.

Payment processing network 150 may include data processing subsystems, networks, and operations used to support and deliver authorization services, exception file services, and clearing and settlement services. An exemplary payment processing network 150 may include VisaNet™. Networks that include VisaNet™ are able to process credit card transactions, debit card transactions, and other types of commercial transactions. VisaNet™, in particular, includes a integrated payments system (Integrated Payments system) which processes authorization requests and a Base II system which performs clearing and settlement services. Payment processing network 150 may use any suitable wired or wireless network, including the Internet.

Issuer 160 refers to any suitable entity that may open and maintain an account associated with portable consumer device 120 for user 110. Some examples of issuers may be a bank, a business entity such as a retail store, or a governmental entity. In many cases, issuer 160 may also issue portable consumer device 120 associated with the account to user 110.

IP Gateway 170 refers to an entity that generates and delivers notifications and alert messages to various delivery channels. IP Gateway may include one or more servers and databases for generation of the alert messages and retrieval of data. IP Gateway 170 may be part of the payment processing network 150 or may be a separate entity in communication with payment processing network 150.

Notification server computer 171 may be a powerful computer or cluster of computers. For example, the server computer can be a large mainframe, a minicomputer cluster, or a group of servers functioning as a unit. In one example, the notification server computer may be a database server coupled to a Web server. Notification server computer 171 includes a computer-readable medium (CRM) 172 and a processor (not shown) coupled to the CRM 172.

Database 173 may be in the form of one or more server computers for storage of data. It may also be in the form of one or more electronic storage units (stand alone hard drives) capable of storing electronic data.

Delivery channel logic 177 may be in the form of an application program that sends the alert messages to the appropriate delivery channel. Delivery channel logic 177 may be part of the IP Gateway 170 or the payment processing network 150. In some embodiments, delivery channel logic runs on a server computer that is in communication with the notification server computer 171. In other embodiments, delivery channel logic may run on the notification server computer 171.

E-mail servers 180 are server computers configured to receive an e-mail from a network connection and store the e-mail in memory for future retrieval.

Mobile device carriers 190 refer to entities that provide wireless infrastructures for wireless data transfer and communication via cellular phone or other mobile devices. Example of such entities are AT&T™, Verizon Wireless™, T-Mobile™, etc.

Mobile device 200 may be in any suitable form. For example, suitable mobile device 200 can be hand-held and compact so that they can fit into a consumer's wallet and/or pocket (e.g., pocket-sized). Some examples of mobile device 200 include desktop or laptop computers, cellular phones, personal digital assistants (PDAs), pagers, payment cards, security cards, access cards, smart media, transponders, and the like. In some embodiments, mobile device 200 and portable consumer device 120 are embodied in the same device.

User computer 210 may be a personal computer or a laptop. The User computer 210 may run an operating system such as Microsoft Windows™ and may have a suitable browser such as Internet Explorer™.

Web services 220 may be in the form of one or more server computers and a website which allows users to enroll in the alert messaging service. Web services may include an enrollment server computer 222 that hosts a website which provides an electronic enrollment form to users to enroll in the alert messaging service. Web services 220 may be provided by the issuer 160 or the payment processing network 150.

II. Method

A. Separation of Processes and Resources

In order to use the transaction data to provide information-based services such as alert messages, yet not burdening various elements of the payment processing network 150 with any additional processing, separate systems in communication with elements of the payment processing network 150 may be used. IP Gateway 170, shown in FIG. 2, includes the elements such as notification server computer 171 and database 173 that are used to generate alert messages from transaction data received from the payment processing server computer 186.

In one embodiment, IP Gateway 170 may be part of the payment processing network 150 and only the server(s) and database(es) used to generate the alert messages be operationally separated from the elements of the payment processing network 150 that are used to perform the payment transactions. In other embodiments, IP Gateway 170 may be separated from the payment processing network 150, as shown in FIG. 2, and embodied as a separate entity.

In a typical purchase transaction, which will be described in detail later, acquirer 140 sends an authorization request to payment processing network 150 (arrow 3 in FIG. 2) which in turn is passed to the issuer 160 (arrow 4). In response, issuer 160 sends an authorization response message back to the payment processing network 150 (arrow 5), which indicates whether the transaction was approved or declined. payment processing network 150 then sends the authorization response message to the acquirer 140 (arrow 6). Using the arrangement as shown in FIG. 2, the process of generating alert messages may begin at the time of receiving the authorization request message from acquirer 140 (arrow 3), or at the time of receiving the authorization response message from the issuer 160 (arrow 5), or both, depending on the type of the alert. The authorization request message and the authorization response message include the transaction data. The authorization request messages may contain more data in addition to transaction data. The authorization response messages may also contain more data in addition to transaction data.

In one embodiment, user 110 may be notified about a transaction before an authorization request message is submitted to the issuer 160. In this situation, transaction data at the time of receiving the authorization request message from the acquirer 140 may be used so that appropriate type of alert is provided to the user 110. This can be used to involve the user 110 in verifying the transaction which may help in fraud detection.

In another embodiment, user 110 may be notified about a transaction after it has been approved or declined by the issuer 160. In this situation, transaction data at the time of receiving the authorization response message from the issuer 160 may be used. This can be used to notify the user about a recent transaction. For example, when user 110 purchases a coffee at a coffee shop, he will receive a message on his mobile device 200 that says: "your card was charged $2.00 at starbucks."

In some embodiments, when transaction data from issuer 160 are used, an alert may be customized based on the result of the transaction and include additional details that gives an "intelligent" aspect to the alert messages. For example, an alert may be withheld if a transaction is declined to avoid any possible confusion. Alternatively, an alert may be issued stating that the transaction was declined and additional details may be provided to help the user 110 understand why the transaction was declined. For example, an alert in this example may say: "transaction was declined. Insufficient available credit," or "Transaction was declined. Verification from cardholder is required. Please contact the issuer."

Utilizing this method and separating the resources and processes, eliminates the burden of processing and generating the alerts from the resources of the payment processing network 150, especially when great level of details and customizations are provided in the alerts. payment processing network 150 forwards the transaction data, that it normally receives from acquirer 140 and issuer 160, to IP Gateway 170. Further processing and customizing the alert messages is performed by the resources of IP Gateway 170. This may advantageously result in a "real time" or "near real time" process, since when transaction data are received by the IP Gateway 170, generation of the alert messages and the rest of the payment processing are performed in parallel.

In addition to eliminating the processing power needed for generating alerts, separation of processes and resources between payment processing network 150 and IP Gateway 170, may be advantageous for the purpose of delivering the generated alerts which requires additional processing. When alerts are generated by the notification server computer 171, they are sent to the delivery channel logic 177 for delivery to the user 110 via a user device. The delivery channel logic 177 may be in the form of one or more software applications running on one or more computers that are tasked with delivery of the alerts to the appropriate delivery channel(s). In one embodiment, the delivery channel logic may be part of the IP Gateway 170. In another embodiment, the delivery channel logic 177 may be a third party entity that receives the alert message via network connection 154 and sends it to an appropriate user device.

In one embodiment, the alert message may be sent along with an identifier that specifies what form of delivery channel should be used for the delivery of the message. Delivery channel logic 177 is in communication with mobile device carriers 190 and e-mail servers 180, for sending the alert messages in formats that are readable by the mobile device 200, and in the form of e-mail messages that are readable by user computer 210.

In some embodiments, an alert may be sent to a user in the form of Interactive Voice Response (IVR), Instant Message (IM), Voicemail, etc. Therefore, FIG. 2 shows that delivery channel logic 177 is in communication with other delivery channels 178 that can deliver the alert messages in a variety of formats to a user device.

It can be appreciated that the architecture of FIG. 2 provides several advantages. For example, generation of the alerts by the IP Gateway 170 and delivery of the alerts by the delivery channel logic 177, will not overload the resources of payment processing network 150 with additional processing. In addition, this architecture allows for outsourcing of the IP Gateway 170, delivery channel logic 177, or any of their elements while reducing any potential security concerns. Given that IP Gateway 170 receives a copy of the transaction data from payment processing network 150, it can be embodied as a third party entity tasked with generation of the alerts. Same applies to delivery channel logic 177. Moreover, segmenting the resources provides the possibility of shutting down the elements used for alert generation and delivery without impacting the transaction processing operations of the payment processing network 150.

B. Enrolment and Linkage of IP Gateway

In order to receive the alert messages, user 110 must be enrolled for the service provided by the alert messaging system 100. There may be multiple ways in which the user 110 may become enrolled in the alert service. In some embodiments, the user 110 may be enrolled automatically by the issuer 160 that issues the portable consumer device 120. Enrollment may also be done in a batch mode, by file delivery from issuer 160 or by file delivery from some other party. In other embodiments, the issuer 160 or payment processing network 150 may provide the alert service as an option to the user 110 at which time the user 110 may enroll in the alert messaging service either by contacting a customer service representative over the phone (provided either by the issuer 160 or payment processing network 150), or by accessing a web site and filling out an online application. This may be done by web services 220. The web services 220 can allow for enrollment of users in the services provided by the IP Gateway 170. In certain implementations, the web site may be hosted by one entity but can redirect the consumer to a site hosted by another entity.

Figure 3A:
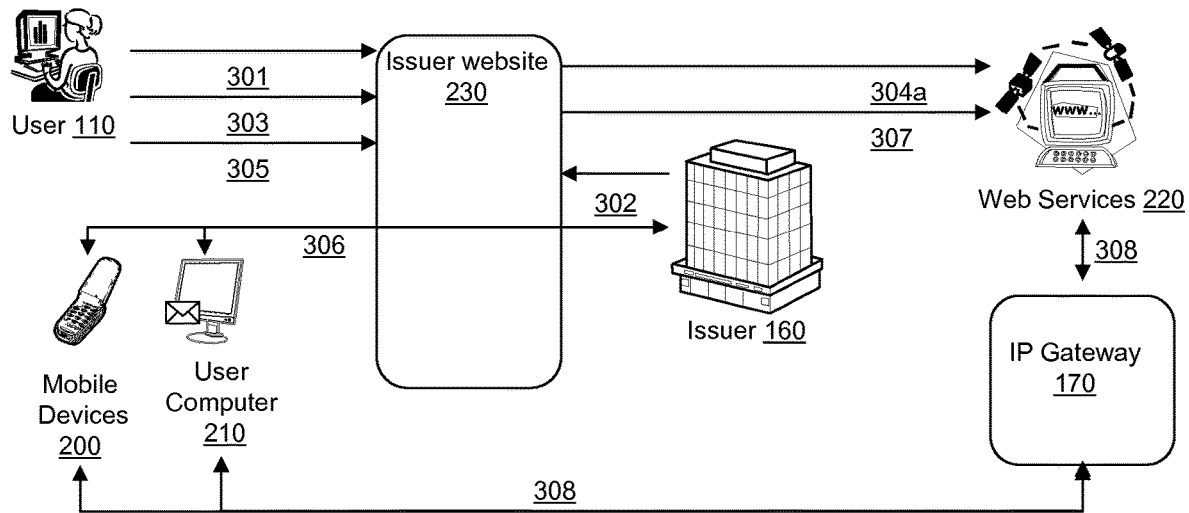
FIG. 3a illustrates the enrollment process in the alert messaging system, according to an embodiment of the invention.
Figure 3B:
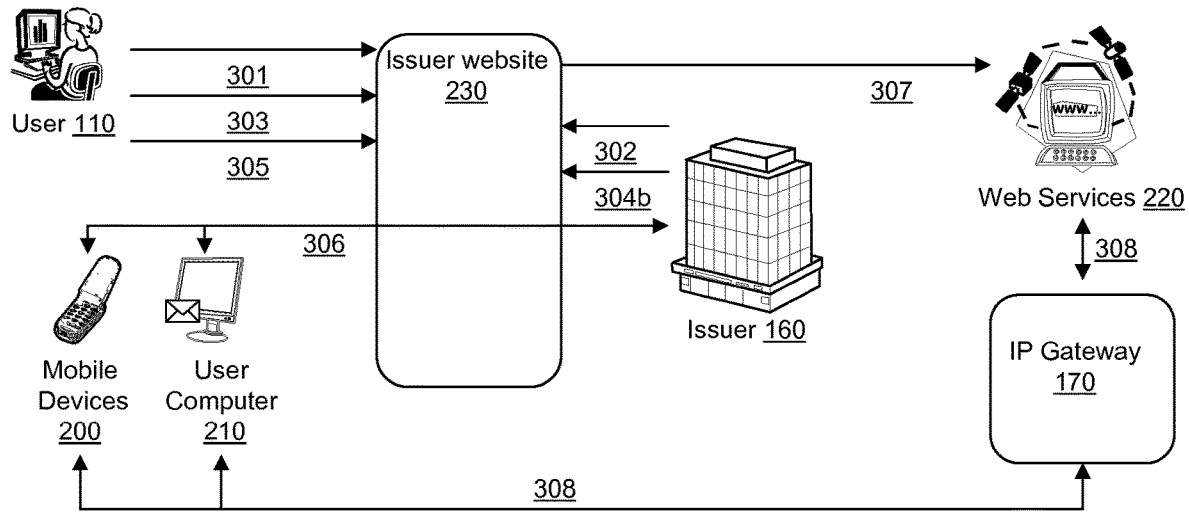
FIG. 3b illustrates the enrollment process in the alert messaging system, according to an embodiment of the invention.

In some embodiments, issuer 160 may integrate its website with the web services 220, and communicate with web services 220 on behalf of the user 110. FIG. 3a and FIG. 3b illustrate two embodiments where user 110 is enrolled in the alert service by communicating with a website provided by the issuer 160 that is integrated with web services 220. These embodiments are illustrated as examples of many possible ways that users may be enrolled in the alert services. These embodiments also illustrate the degree of flexibility and customization that the architecture of FIG. 2 provides for other entities such as issuer 160 to interact with the alert messaging system while maintaining the security, and without using the resources of the payment processing network 150. Therefore, those skilled in the art will understand that the following embodiments are illustrative and not restrictive.

Figure 4:
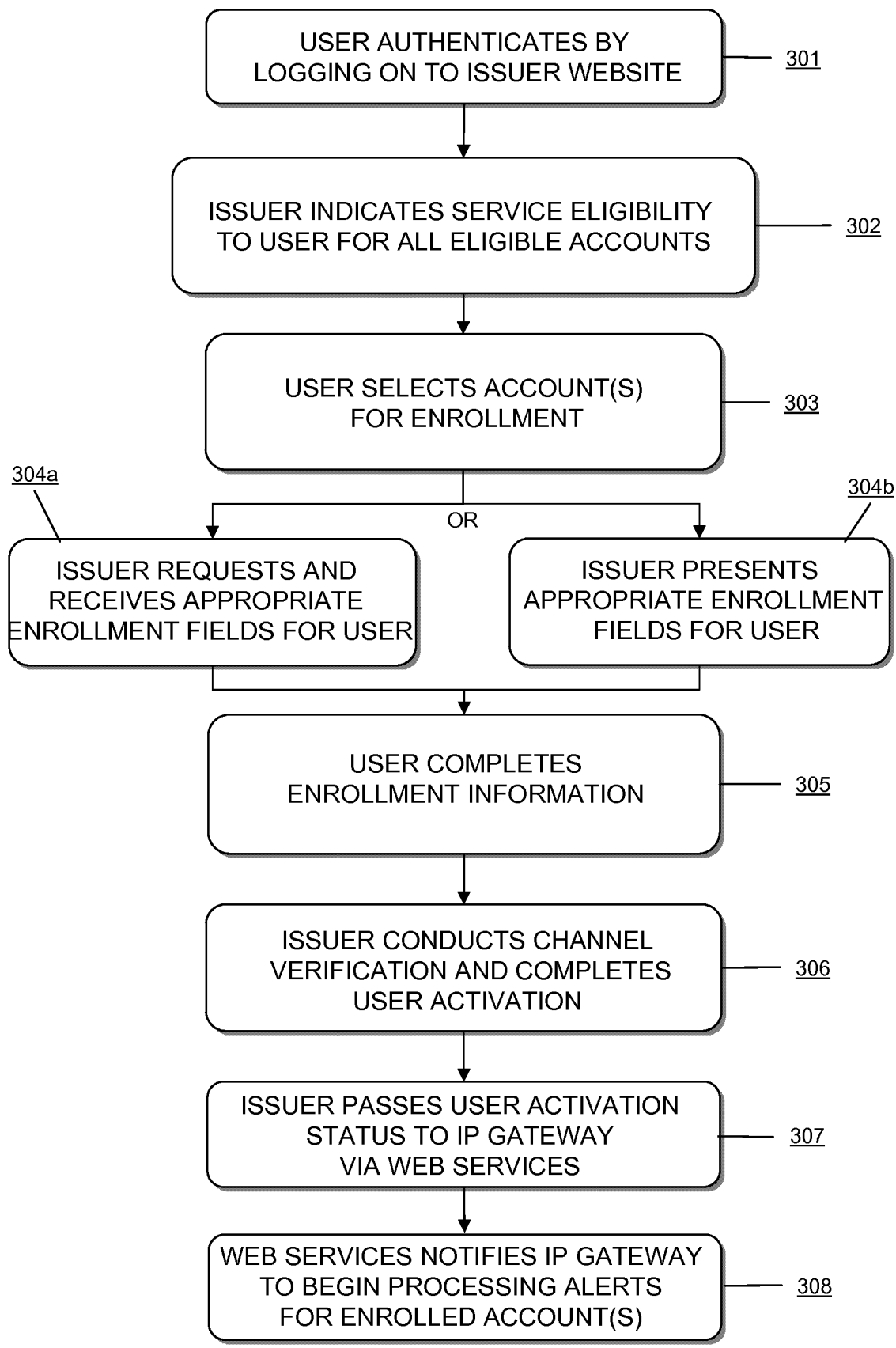
FIG. 4 shows a flowchart illustrating the steps involved in the enrollment processes shown in FIG. 3a and FIG. 3b, according to embodiments of the invention.

Going back to FIG. 3a and FIG. 3b, two possible methods of enrolling users with a web site 230 provided by issuer 160 that is integrated with web services 220 are illustrated. FIG. 4 is a flowchart that describes the steps in FIG. 3a and FIG. 3b. As shown in both FIG. 3a and FIG. 3b, user 110 enters the issuer web site 230 and authenticates himself. This is shown as step 301 in FIG. 4. Issuer 230 then indicates services eligibility for the accounts that the user 110 holds with the issuer 160. (Step 302 in FIG. 4). User 110 then selects one or more of his accounts for enrollment. (Step 303 in FIG. 4). Next, user 110 is presented with an electronic enrollment form to be filled out. Appropriate fields of this form may be provided by the issuer 160, or based on an arrangement between issuer 160 and web services 220, the fields may be provided by the web services 220. FIG. 3a illustrates the embodiment in which issuer 160 requests and receives appropriate fields for user 110 from web services 220. This is shown at step 304a in FIG. 4. FIG. 3b illustrates the embodiment in which the issuer 160 directly presents the appropriate enrollment fields for the user 110. This is shown as step 304b in FIG. 4. From the vantage point of the user 110 there will be no difference in either of these embodiments, because the integration of the issuer website 230 and the web services 220 is done in the background.

Thereafter, user 110 completes the enrollment information. (step 305 in FIG. 4). Issuer 160 conducts a channel verification and completes the user activation. (Step 306 in FIG. 4). In step 306, issuer 160 verifies and activates the delivery channels such as e-mail, SMS messaging, etc. that user 110 requested when filling out the electronic enrollment form. The user activation status is then passed by issuer 160 to the IP Gateway 170 via web services 220. (Step 307 in FIG. 4). Finally IP Gateway begins processing alerts for the enrolled account(s) of user 110. (step 308 in FIG. 4).

Once the user 110 is enrolled in the alert service, appropriate information regarding the user 110 such the preferences and type of user device(es) used for delivery of alerts, account identifier (account number or any other data that identifies the user account enrolled in the alert service), etc. are stored in the cardholder enrollment data 175 in the database 173. Cardholder enrollment data 175 are used along with issuer data 176 and transaction data 174 for generation of the alert messages. As a result of the enrollment process, cardholder enrollment data 175 in the database 173 will contain a group of account identifiers that indicate the account numbers of users enrolled in the alert messaging service.

In some embodiments, only the transaction requests/responses that are associated with an account that is enrolled in the alert messaging system 100 are sent to the IP Gateway 170. In order for the payment processing network 150 to determine whether the transaction data are associated with a portable consumer device 120 that is enrolled in the alert service, the payment processing network 150 maintains a list of account identifiers (account numbers or any other data that identifies the user accounts enrolled in the alert service) associated with the portable consumer devices of users who are enrolled in the alert messaging service. This list is stored in the enrollment database 152. The account identifiers in the enrollment database 152 are synchronized with the appropriate portion(s) of the cardholder enrollment data 175 via synchronization link 156. Synchronization link 156 may be in any suitable form. For example, the synchronization link 156 may be in the form of local area network connection or Internet.

Synchronization link 156 stores a copy of the group of account identifiers that are stored in cardholder enrollment data 175, into enrollment database 152. This will make the enrollment database 152 to act as a "thin" database that stores an appropriate portion of the data in the database 173, and allows the payment processing server computer 186 to initiate the process of alert message generation and delivery by accessing a thin database (enrollment database 152).

Synchronization link 156 performs the synchronization process between an appropriate portion of the data stored in the database 173 and enrollment database 152, at predetermined times or as new data are stored in the database 173. In some embodiments, synchronization link 156 synchronizes the data (the group of account identifiers) at predetermined times per day. For example, in one embodiment, synchronization link 156 may synchronize the data at the end of each day. In this situation, users who enroll their accounts with the alert messaging service will have to wait until the next day for activation. In some other embodiments, synchronization link 156 may synchronize the data as they are stored in the database 173. In such embodiments, user's accounts will be enrolled in the alert messaging service shortly after they finish the enrollment process. In some embodiments, synchronization link 156 may synchronize the data certain number of times per day at predetermined times or based on a predetermined number of new enrolled accounts.

After the payment processing network 150 receives an authorization request message from the acquirer 140, authorization response message from the issuer 160, or both, an application program, running on a computer system such as the payment processing server computer 186, compares the account number and/or other forms of account identifier(s) associated with the authorization request message (or the authorization response message) with a list of account identifiers of the enrolled account numbers in the enrollment database 152. If there is a match, which indicates that the account number associated with portable consumer device 120 is enrolled in the alert messaging service, the payment processing network 150 sends the transaction data 174 associated with that particular transaction to the IP Gateway 170.

If the transaction is associated with account number that is not enrolled in the alert service, payment processing network 150 does not send the transaction data to IP Gateway 170 and resumes the payment processing. This prevents the IP Gateway from having to process unnecessary transactions while maintaining a secure and fast process flow. This dual database approach provides for fast processing as it can filer out the transactions that require alert processing from the transactions that do not.

C. Performing Transactions and Providing Alert Messages

Figure 5:
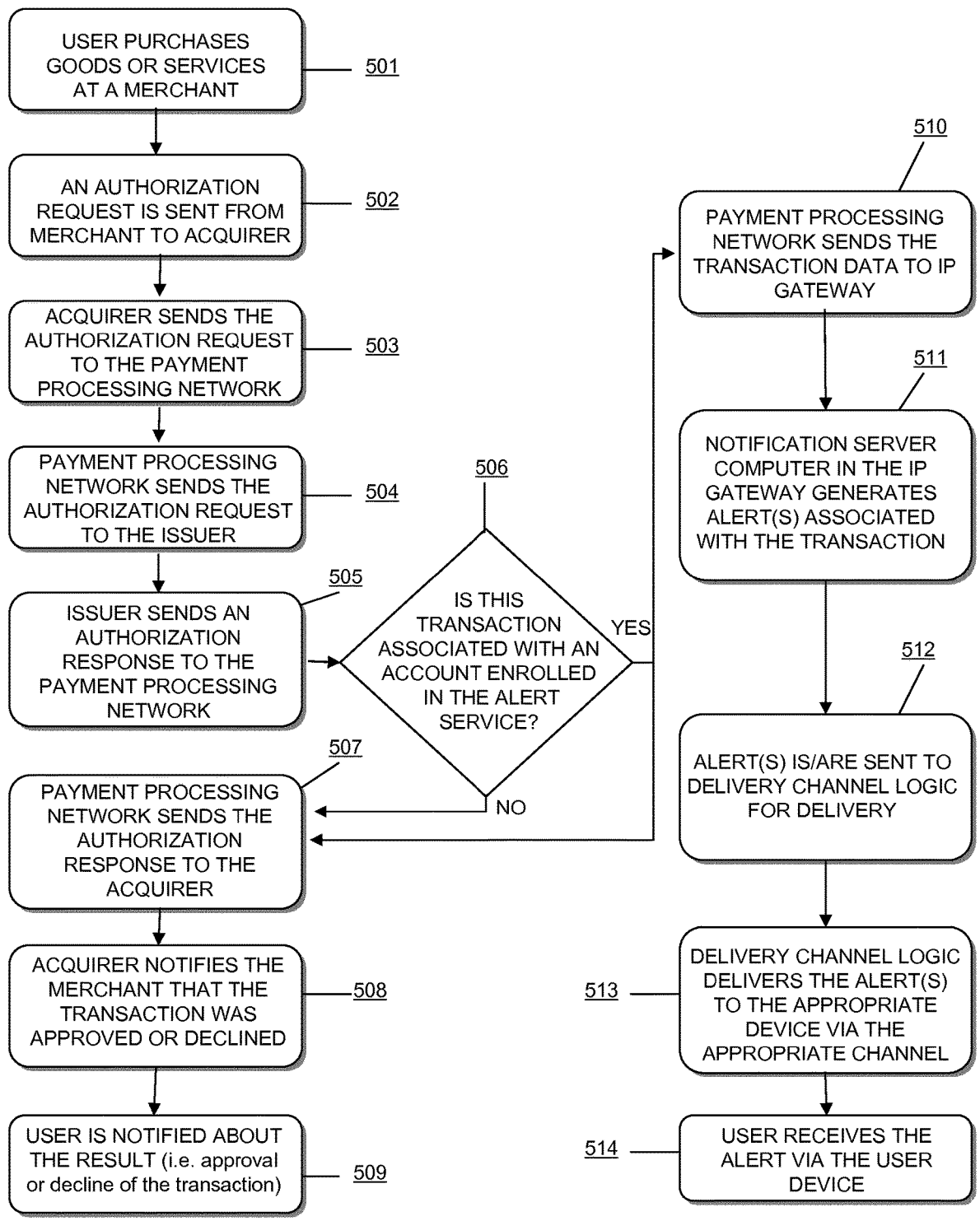
FIG. 5 shows a flowchart illustrating the steps involved in performing an electronic payment transaction and providing one or more alert associated with the payment transaction, according to embodiments of the invention.

FIG. 1 and the flowchart of FIG. 5 illustrate the entire process from performing a transaction until generation and delivery of alert(s) associated with the transaction. In a typical purchase transaction (payment transaction), the user 110 purchases goods or services at the merchant 130 using the portable consumer device 120 (arrow 1 in FIG. 1 and step 501 in FIG. 5). An authorization request message comprising transaction data is generated by a processor in the access device 132 after the portable consumer device 120 interacts with the access device 132. The authorization request message may comprise, for example, the BIN (bank identification number), the account identifier (account number) and expiration date associated with the portable consumer device 120, the purchase amount, and a merchant code such as a merchant category code (MCC). The authorization request message is then forwarded from the merchant 130 to the acquirer 140 (arrow 2 in FIG. 1 and step 502 in FIG. 5). After receiving the authorization request message, the acquirer 140 then sends it to the payment processing network 150 (arrow 3 in FIG. 1 and step 503 in FIG. 5).

The payment processing network 150 then forwards the authorization request message to the issuer 160 of the portable consumer device 120 (arrow 4 in FIG. 1 and step 504 in FIG. 5). After the issuer 160 receives the authorization request message, the issuer 160 sends an authorization response message back to the payment processing network 150 to indicate whether or not the current transaction is authorized (arrow 5 in FIG. 1 and step 505 in FIG. 5).

At this point, payment processing server computer 186 (shown in FIG. 2) accesses the enrollment database 152 (also shown in FIG. 2) to determine if the transaction is associated with an account identifier that is stored in the enrollment database 152 (step 506 in FIG. 5). If the transaction is associated with an account enrolled in the alert service, appropriate portions, or in some embodiments, the entirety of transaction data that includes the account identifier are sent to the IP Gateway 170 (arrow 6b in FIG. 1 and step 510 in FIG. 5). Step 506 in FIG. 5 may also be performed after, or concurrent with step 503. In some embodiments, payment processing network 150 may send the transaction data at the time of receiving an authorization request message. In some other embodiments, the payment processing network 150 may send transaction data both at the time of receiving the authorization request message and at the time of receiving the authorization response message. As mentioned before (in section A), this can be used for different types of alerts.

In either case (i.e., transaction is associated with an enrolled account or not), after the payment processing network 150 receives the authorization response message, it then forwards the authorization response message back to the acquirer 140 (arrow 6 in FIG. 1 and step 507 in FIG. 5). The acquirer 140 then sends the response message back to the merchant 130 (arrow 7 in FIG. 1 and step 508 in FIG. 5), and it is then presented to the user 110 (arrow 8 in FIG. 1 and step 509 in FIG. 5).

If at step 506 (FIG. 5) it is determined that the transaction is associated with an account not enrolled in the alert service (i.e. account identifier does not exist in enrollment database 152), the process of performing the transaction continues without sending the transaction data to the IP Gateway 170.

For transactions associated with enrolled accounts in the alert messaging service, steps 510 to 514 in FIG. 5 are performed parallel to steps 507 to 509. Steps 510 to 514 are performed by IP Gateway 170 and delivery channel logic 177. After the transaction data are sent to IP Gateway 170 (step 510), notification server computer 171 generates the appropriate alert(s) for that transaction.

The determining factor in formatting and complexity of alert messages may be the combination of user preferences, technical requirements regarding the delivery channels, issuer preferences, and availability of data regarding the transactions. The notification server computer 171 considers such criteria when generating an alert message. Depending on preferences of the user in terms of the types of alerts, conditions in which trigger the generation of alerts, format, method of delivery, language, issuer criteria and rules, information in the transaction data, etc., that are stored in database 173 and collectively referred to as "customization data", the notification server computer 171 generates one or more alerts in the form of messages, sounds, images, impressions or any combination thereof.

In one embodiment, an alert may be in a short format notifying the user 110 about a recent transaction. For example, if the user 110 uses the consumer portable device 120 to buy groceries, the alert message may state "The card was used for the purchase of groceries." In other embodiments, the alert may be in the form of an intelligent alert message enhanced with additional information such as the name of the merchant, location of the merchant and the amount of the transaction. For example, if the user 110 used the portable consumer device 120 for purchasing $45.00 fuel at a Shell gas station at 123 First Street in San Francisco, the message may state "The card was used to purchase fuel at the Shell gas station in 123 First Street in San Francisco in the amount of $45.00."

Alternatively or additionally, an alert may be in the form of a customized sound file played on the mobile device 200. Also, conditions that triggers the alerts may be set by the user 110, or the issuer 160, or both. Such conditions may include a range of possibilities from generating alert for every transaction to generating alerts for purchase amounts more than a specified number. The form of the alerts may also be customized by user 110, or issuer 160, or both. For example, user 110 may specify during the enrollment process that he wants to receive an intelligent alert message for all the transaction with amount grater than $100 while receiving a sound file indicating the transactions below $100. In addition, user 110, issuer 160, or both may specify what types of delivery channel to be used and for what types of alerts. Based on such preferences, some alerts may be delivered via an e-mail message to the user's e-mail account while some other alerts are delivered to the user's mobile device 200 in the form of a SMS message.

Referring again to FIG. 5, notification server computer 171 generates one or more alerts (step 511) for the transaction. The one or more alerts are sent to the delivery channel logic 177 (step 512) to be delivered to the user device (i.e. mobile device 200 and/or user computer 210 shown in FIG. 1). The alerts are delivered via mobile device carriers 190, e-mail servers 180 or other delivery channel logic 178 (step 513). Finally, the one or more alerts are received by the user 110 via the designated user device. (i.e., mobile device 200 and/or user computer 210).

It can be appreciated that the architecture shown in FIG. 2 provides the ability of using the transaction data to generate and deliver alert messages associated with the transactions without affecting the processing resources of the payment processing network 150. For example, if transaction data for all transactions are sent to the notification server computer 171 for processing, the notification server computer may become overburdened with data. By providing a "thin" database in the payment processing network, only transaction data associated with cardholders enrolled in the alerts services are sent to the notification server for processing. This way, transaction data associated with cardholders that are not enrolled in the alert messaging service is processed quickly.

Moreover, the architecture in FIG. 2 provides a way of sending and receiving additional data from other entities such as issuers and the users to be utilized for generation and delivery of the alerts. Data are exchanged between issuers, users and other entities without storing that data in the resources of payment processing network 150 that may potentially result in security concerns. The sensitive resources of payment processing network 150 remain intact and undisturbed while payment processing network 150 communicates with IP Gateway 170 for generation of alerts.

Figure 6:
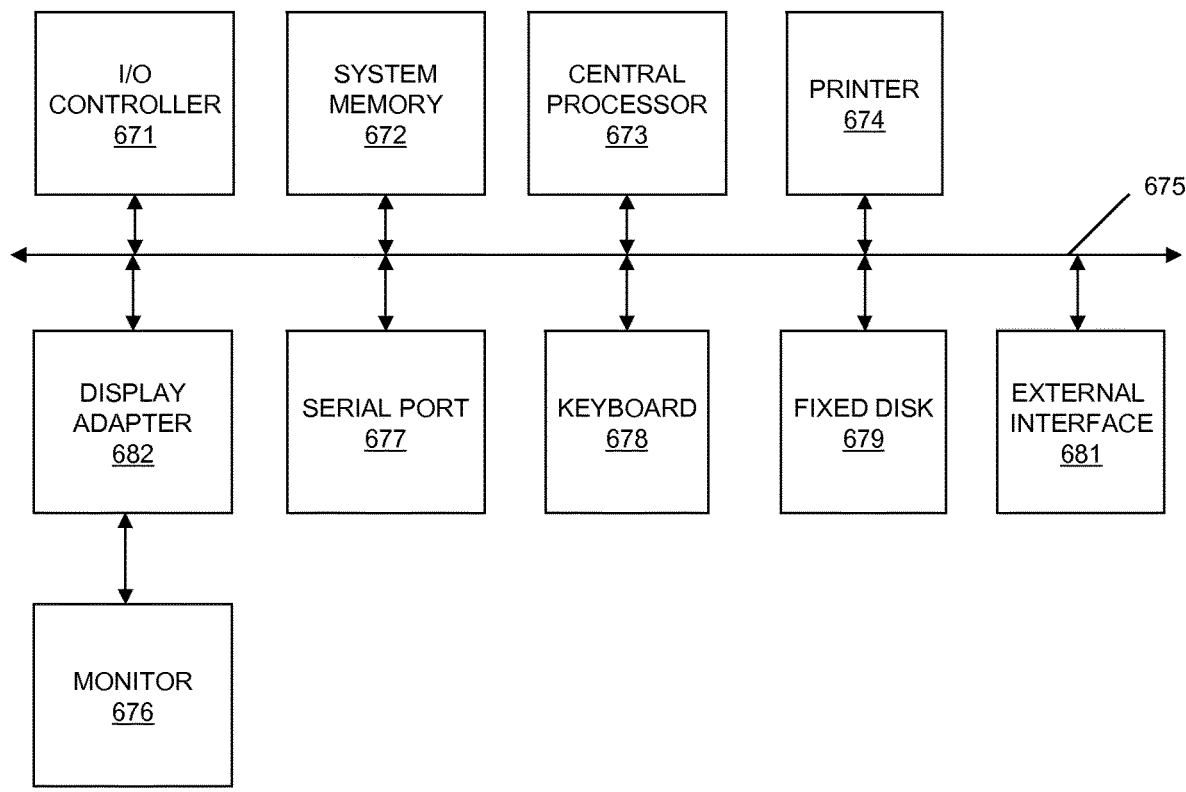
FIG. 6 shows a system according to an embodiment of the invention.

The various participants and elements in the previously described system diagrams (e.g., the computers, issuers, servers, etc. in FIGS. 1, 2, 3a and 3b) may use any suitable number of subsystems to facilitate the functions described herein. Examples of such subsystems or components are shown in FIG. 6. The subsystems shown in FIG. 4 are interconnected via a system bus 675. Additional subsystems such as a printer 674, keyboard 678, fixed disk 679 (or other memory comprising computer-readable media), monitor 676, which is coupled to display adapter 682, and others are shown. Peripherals and input/output (I/O) devices, which couple to I/O controller 671, can be connected to the computer system by any number of means known in the art, such as serial port 677. For example, serial port 677 or external interface 681 can be used to connect the computer apparatus to a wide area network such as the Internet, a mouse input device, or a scanner. The interconnection via system bus allows the central processor 673 to communicate with each subsystem and to control the execution of instructions from system memory 672 or the fixed disk 679, as well as the exchange of information between subsystems. The system memory 672 and/or the fixed disk 679 may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
   receiving, by a server computer system, first transaction data comprising a first account identifier;
   determining, by the server computer system that an account identifier corresponding to the first account identifier is present in a first enrollment database comprising a group of account identifiers, wherein the server computer system and the first enrollment database are in a payment processing network;
   sending, by the server computer system, at least a portion of the first transaction data to a notification computer system, which is in communication with a second enrollment database comprising at least the group of account identifiers, the sending based at least in part on the determining that an account identifier corresponding to the first account identifier is present in the first enrollment database, wherein the notification computer system thereafter causes sending of an alert message to a user device and wherein the notification computer system and the second enrollment database are in a communication network distinct from the payment processing network;
   receiving, by the server computer system, second transaction data comprising a second account identifier;
   determining, by the server computer system, that an account identifier corresponding to the second account identifier is not present in the first enrollment database comprising the group of account identifiers; and
   transmitting an authorization response message associated with the second transaction data to a merchant without sending, by the server computer system, at least a portion of the second transaction data to the notification computer system, the without sending based at least in part on the determining that an account identifier corresponding to the second account identifier is not present in the first enrollment database,
   wherein the first enrollment database and second enrollment database are linked with a synchronization link that stores a portion of data from the second enrollment database in the first enrollment database such that the first enrollment database acts as a thin database with respect to the second enrollment database.

2. The method of claim 1, further comprising providing the second account identifier to the first enrollment database, but not the second enrollment database.

3. The method of claim 2, wherein the second account identifier is associated with an account enrolled in an alert messaging service.

4. The method of claim 1, wherein he a notification computer system retrieves alert customization data associated with the first account identifier for generation of the alert message.

5. The method of claim 1, wherein sending the alert message occurs in parallel with transmission of an authorization response message associated with the first transaction data from the payment processing network to a merchant device.

6. The method of claim 1, wherein the first transaction data is present in an authorization request message received from an acquirer.

7. The method of claim 1, wherein the first transaction data is present in an authorization response message associated with the first transaction data from an issuer.

8. A method comprising:
   receiving, by a server computer system, first transaction data comprising a first account identifier;
   determining, by the server computer system that an account identifier corresponding to the first account identifier is present in a first enrollment database comprising a group of account identifiers, wherein the server computer system and the first enrollment database are in a payment processing network; and sending, by the server computer system, at least a portion of the first transaction data to a notification computer system, which is in communication with a second enrollment database comprising at least the group of account identifiers, the sending based at least in part on the determining that an account identifier corresponding to the first account identifier is present in the first enrollment database, wherein the notification computer system thereafter causes sending of an alert message to a user device and wherein the notification computer system and the second enrollment database are in a communication network distinct from the payment processing network;

wherein the first enrollment database and second enrollment database are linked with a synchronization link that stores a portion of data from the second enrollment database in the first enrollment database such that the first enrollment database acts as a thin database with respect to the second enrollment database and the sending of the at least a portion of the first transaction data to the notification computer system is further based at last in part on the synchronization between the second enrollment database and the first enrollment database.

9. The method of claim 8, further comprising providing a second account identifier to the first enrollment database, but not the second enrollment database.

10. The method of claim 9, wherein the second account identifier is associated with an account enrolled in an alert messaging service.

11. The method of claim 8, wherein the notification computer system retrieves alert customization data associated with the first account identifier for generation of the alert message.

12. The method of claim 8, wherein sending the alert message occurs in parallel with transmission of an authorization response message associated with the first transaction data from the payment processing network to a merchant device.

13. The method of claim 8, wherein the first transaction data is present in an authorization request message received from an acquirer.

14. The method of claim 8, wherein the first transaction data is present in an authorization response message associated with the first transaction data from an issuer.

15. One or more non-transitory computer-readable media having stored thereon computer-executable instructions that, when executed with one or more processors, collectively cause a computing system to, at least:

receive first transaction data comprising a first account identifier;

determine that an account identifier corresponding to the first account identifier is present in a first enrollment database comprising a group of account identifiers, wherein the computing system and the first enrollment database are in a payment processing network;

send at least a portion of the first transaction data to a notification computer system, which is in communication with a second enrollment database comprising at least the group of account identifiers, the sending based at least in part on the determining that an account identifier corresponding to the first account identifier is present in the first enrollment database, wherein the notification computer system thereafter causes sending of an alert message to a user device and wherein the notification computer system and the second enrollment database are in a communication network distinct from the payment processing network;

receive second transaction data comprising a second account identifier;

determine that an account identifier corresponding to the second account identifier is not present in the first enrollment database comprising the group of account identifiers; and inhibit sending at least a portion of the second transaction data to the notification computer system, the inhibiting based at least in part on the determining that an account identifier corresponding to the second account identifier is not present in the first enrollment database, wherein the first enrollment database and second enrollment database are linked with a synchronization link that stores a portion of data from the second enrollment database in the first enrollment database such that the first enrollment database acts as a thin database with respect to the second enrollment database.

16. The one or more non-transitory computer-readable media of claim 15, wherein the computer-executable instructions further cause the computer system to provide the second account identifier to the first enrollment database, but not the second enrollment database.

17. The one or more non-transitory computer-readable media of claim 16, wherein the second account identifier is associated with an account enrolled in an alert messaging service.

18. The one or more non-transitory computer-readable media of claim 15, wherein sending the alert message occurs in parallel with transmission of an authorization response message associated with the first transaction data from the payment processing network to a merchant device.

19. The one or more non-transitory computer-readable media of claim 15, wherein the first transaction data is present in an authorization request message received from an acquirer.

20. The one or more non-transitory computer-readable media of claim 15, wherein the first transaction data is present in an authorization response message associated with the first transaction data from an issuer.

* * * * *